United States Patent
Hetherington

[15] 3,704,995
[45] Dec. 5, 1972

[54] PIPE MANIFOLD FLANGE
[72] Inventor: Theodore W. Hetherington, Jackson, Mich.
[73] Assignee: Tenneco Inc., Racine, Wis.
[22] Filed: May 5, 1971
[21] Appl. No.: 140,501

[52] U.S. Cl. .................................. 285/332, 285/412
[51] Int. Cl. .............................................. F16l 25/00
[58] Field of Search .......... 285/382.5, 332, 386, 412, DIG. 7

[56] References Cited

UNITED STATES PATENTS

| | | | |
|---|---|---|---|
| 2,463,883 | 3/1949 | Kinsey | 285/382.5 X |
| 1,955,832 | 4/1934 | Roybould | 285/354 X |
| 2,685,461 | 8/1954 | Mueller | 285/382.5 X |
| 3,109,673 | 11/1963 | Wurzburger | 285/DIG. 7 |

FOREIGN PATENTS OR APPLICATIONS

| | | | |
|---|---|---|---|
| 1,236,595 | 6/1960 | France | 285/332 |

*Primary Examiner*—Dave W. Arola
*Attorney*—Harness, Dickey & Pierce

[57] ABSTRACT

Means for attaching an exhaust pipe to an exhaust manifold comprises an annulus having conical sides that is expanded near the end of the exhaust pipe and held tightly against the manifold by an attachment pad that is loosely mounted on the exhaust pipe.

1 Claim, 2 Drawing Figures

PATENTED DEC 5 1972

3,704,995

INVENTOR
Theodore W. Hetherington
BY
Harness, Dickey & Pierce
ATTORNEYS

3,704,995

PIPE MANIFOLD FLANGE

BRIEF SUMMARY OF THE INVENTION

It is the purpose of this invention to eliminate the use of a gasket and a welded pad in connection with the attachment of an exhaust pipe to a manifold and to also improve the means for connecting a fluid flow pipe to a housing.

The invention accomplishes this purpose by forming an annular enlargement near the end of the exhaust pipe and shaping the manifold and an attachment pad to sealingly engage opposite sides of the enlargement.

DESCRIPTION OF THE INVENTION

Figures 1, 2:
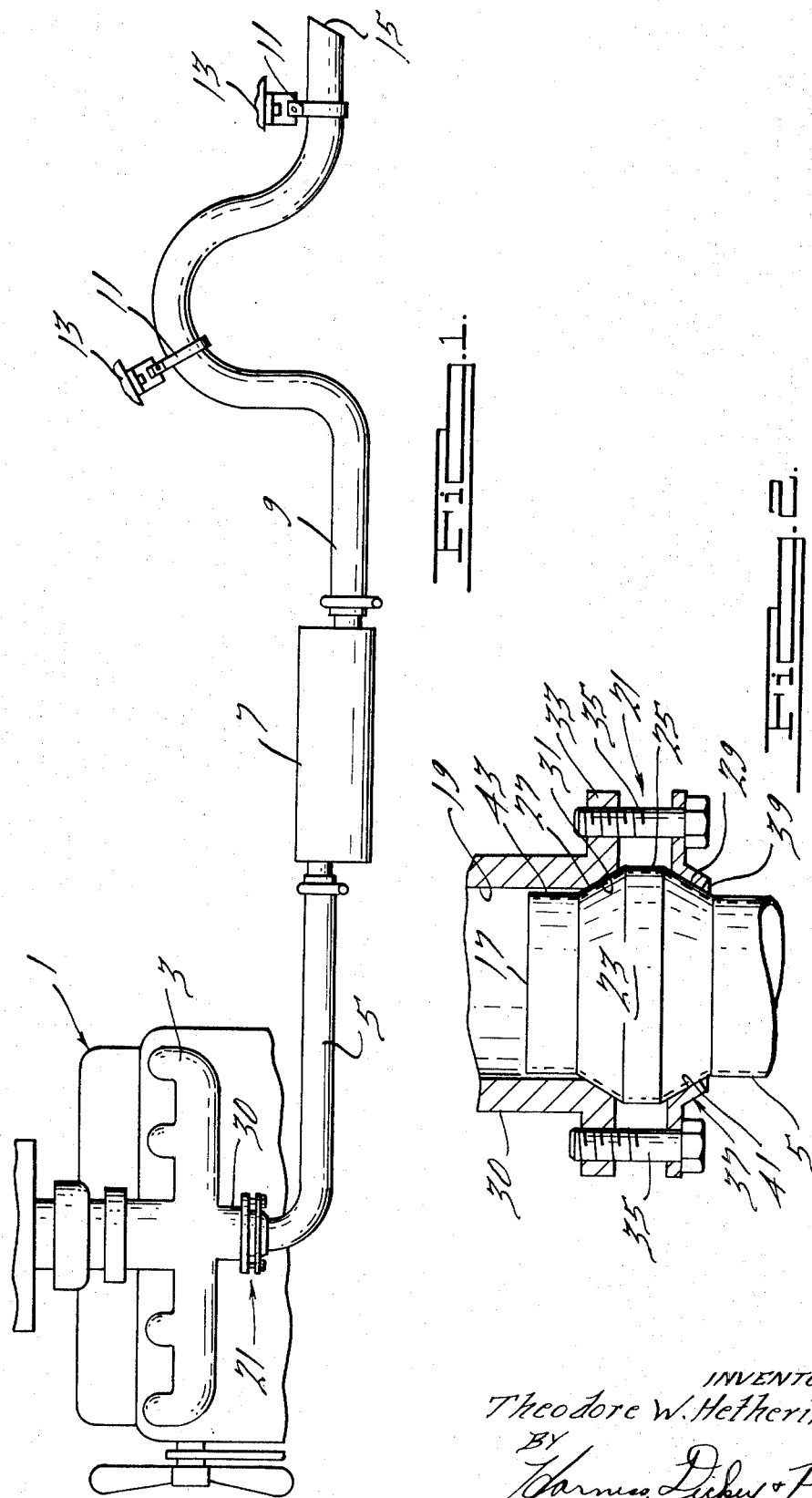
FIG. 1 is a schematic view of an internal combustion engine exhaust system embodying the invention.
FIG. 2 is an enlarged cross sectional view broken away of the improved joint provided by the invention.

An internal combustion engine 1 has an exhaust manifold housing 3 which discharges exhaust gases into an exhaust system which includes an exhaust pipe or tubular conduit 5 which in turn carries the gases to an exhaust muffler 7. Silenced gases leave the muffler 7 to enter a tailpipe 9, which is mounted by means of suitable hangers 11 on the frame 13 of an automobile, and discharges gases through end opening 15 to atmosphere.

The present invention concerns the means for coaxially attaching the inlet end 17 of the exhaust pipe 5 to the outlet passage 19 of the exhaust manifold housing 3, such connection being by way of a novel joint 21. As seen in FIG. 2, an annular enlargement 23 is formed close to the inlet end 17 of the exhaust pipe 5 and comprises a central enlarged uniform diameter section 25 which is located between conical sections 27 and 29 that taper from the diameter 25 to the normal and uniform diameter of the pipe 5.

The outlet section 30 of the manifold 3 has a conical seat 31 to receive the conical section 27 of the annulus 23 and a flange section 33 that contains threaded holes to receive a pair of bolts 35 that extend through holes in an attachment pad 37 and serves as means for securing the attachment pad 37 to the manifold. The attachment pad has a neck 39 with a conical seat 41 that fits against the conical section 29 of the annulus 23, the pad 37 being mounted on the pipe 5 downstream of the annulus 23 in a loose manner so that it can slide or rotate on the pipe.

When the pad 37 is pressed toward the manifold flange 33 by tightening of the bolts 35 the conical faces 27 and 29 will be pressed tightly against the corresponding conical seats so that a sealed joint is obtained. Additionally, the conical shape of the annulus 23 can compress resiliently or elastically to a slight degree thereby furnishing a spring action that maintains tension on the bolts 35 and inhibits loosening of the joint throughout wide temperature variations and absorbs thermal expansion associated with wide temperature variations to reduce or eliminate the possibility of thermal overloading of the bolts.

The annulus 23 may be formed as shown by conventional forming equipment of a type now in use in the field. As seen in FIG. 2, the annulus 23 is placed slightly downstream of the end opening 17 in the pipe 5 so that there is a uniform diameter section 43 or sufficient length at the extreme inlet end of the pipe to act to enter passage 19 and act as a pilot during the connection of the parts together to form a joint.

Modifications in the specific structure shown may be made without departing from the spirit and scope of the invention.

I claim:

1. In a fluid flow system such as the exhaust system of an internal combustion engine, said system including a housing having a fluid passage therethrough and flange means attached to said housing containing attachment holes, a tubular uniform diameter conduit for connection to the housing to communicate with the passage, said conduit having an axis and an annular enlargement adjacent the housing end of the conduit extending radially with respect to the axis, said annular enlargement comprising a central cylindrical portion coaxial with the conduit and of larger diameter than the diameter of said conduit, said enlargement further comprising conical portions on opposite sides of said cylindrical portion connecting it to the conduit, an attachment pad having attachment holes therein to receive bolts for attaching it to said attachment holes of the housing, said pad having an opening therein smaller than said annular enlargement and said conduit extending through said opening, bolts extending through the pad attachment holes and into the housing attachment holes and holding the pad against the enlargement, said pad being movable axially and angularly on said conduit prior to attachment to the housing by said bolts and being forcibly pressed against the conical portion on one side of said enlargement by attachment by said bolts of the pad to said housing, said housing having a conical seating surface fitting to and engaging the other of said conical portions when said pad is attached to said housing, said enlargement being resiliently compressed in an axial direction upon attachment of the pad to the housing and the tendency of the enlargement to elastically return to its uncompressed shape applying a tension to said bolts holding the pad to the housing to inhibit loosening of the bolts, said enlargement being axially spaced from the housing end of the conduit to provide a conduit end section, said end section fitting in said fluid passage free of contact with said housing when said enlargement undergoes said resilient compression and acting as a pilot means for connecting the conduit to the housing.

* * * * *